US010776054B2

(12) United States Patent
Mizutani

(10) Patent No.: US 10,776,054 B2
(45) Date of Patent: Sep. 15, 2020

(54) NON-TRANSITORY COMPUTER-READABLE RECORDING MEDIUM STORING COMPUTER-EXECUTABLE INSTRUCTIONS FOR INFORMATION PROCESSING DEVICE, AND METHOD OF CONTROLLING INFORMATION PROCESSING DEVICE

(71) Applicant: BROTHER KOGYO KABUSHIKI KAISHA, Nagoya-shi, Aichi (JP)

(72) Inventor: Aiko Mizutani, Nagoya (JP)

(73) Assignee: BROTHER KOGYO KABUSHIKI KAISHA, Nagoya-Shi, Aichi (JP)

( * ) Notice: Subject to any disclaimer, the term of this patent is extended or adjusted under 35 U.S.C. 154(b) by 0 days.

(21) Appl. No.: 16/367,652

(22) Filed: Mar. 28, 2019

(65) Prior Publication Data
US 2019/0303053 A1    Oct. 3, 2019

(30) Foreign Application Priority Data

Mar. 30, 2018  (JP) ................................. 2018-066688

(51) Int. Cl.
*G06F 3/12* (2006.01)
*H04N 1/00* (2006.01)

(52) U.S. Cl.
CPC .......... *G06F 3/1204* (2013.01); *G06F 3/1226* (2013.01); *G06F 3/1254* (2013.01); *G06F 3/1261* (2013.01); *H04N 1/00413* (2013.01)

(58) Field of Classification Search
CPC .... G06F 3/1204; G06F 3/1254; G06F 3/1261; G06F 3/1226; H04N 1/00413

USPC ................................................ 358/1.15, 1.13
See application file for complete search history.

(56) References Cited

U.S. PATENT DOCUMENTS

| | | | |
|---|---|---|---|
| 9,019,535 B1 * | 4/2015 | Hansen | G06F 3/1203 358/1.13 |
| 2016/0212124 A1 | 7/2016 | Katayama et al. | |
| 2018/0220015 A1 * | 8/2018 | Akuzawa | H04N 1/21 |

FOREIGN PATENT DOCUMENTS

JP    2016-133830 A    7/2016

* cited by examiner

*Primary Examiner* — Tammy Paige Goddard
*Assistant Examiner* — Darryl V Dottin
(74) *Attorney, Agent, or Firm* — Scully Scott Murphy and Presser

(57) ABSTRACT

Non-transitory computer-readable recording medium stores computer-executable instructions which cause, when executed, a controller of an information processing device to obtain a list of printers registered with an operating system installed to the information processing device, obtaining a list of print programs installed in the information processing device, store identifiers of the list of printers and the list of the print programs as obtained in a memory, detect whether a first user operation is input through an inputting device of the information processing device, when input of the first user operation is detected, extract one of the printers in the list of printers and print programs in the list of print programs stored in the memory and setting the extracted one of the printers and the print programs to the output destination, and when the output destination is one of the print programs, start the print program.

14 Claims, 10 Drawing Sheets

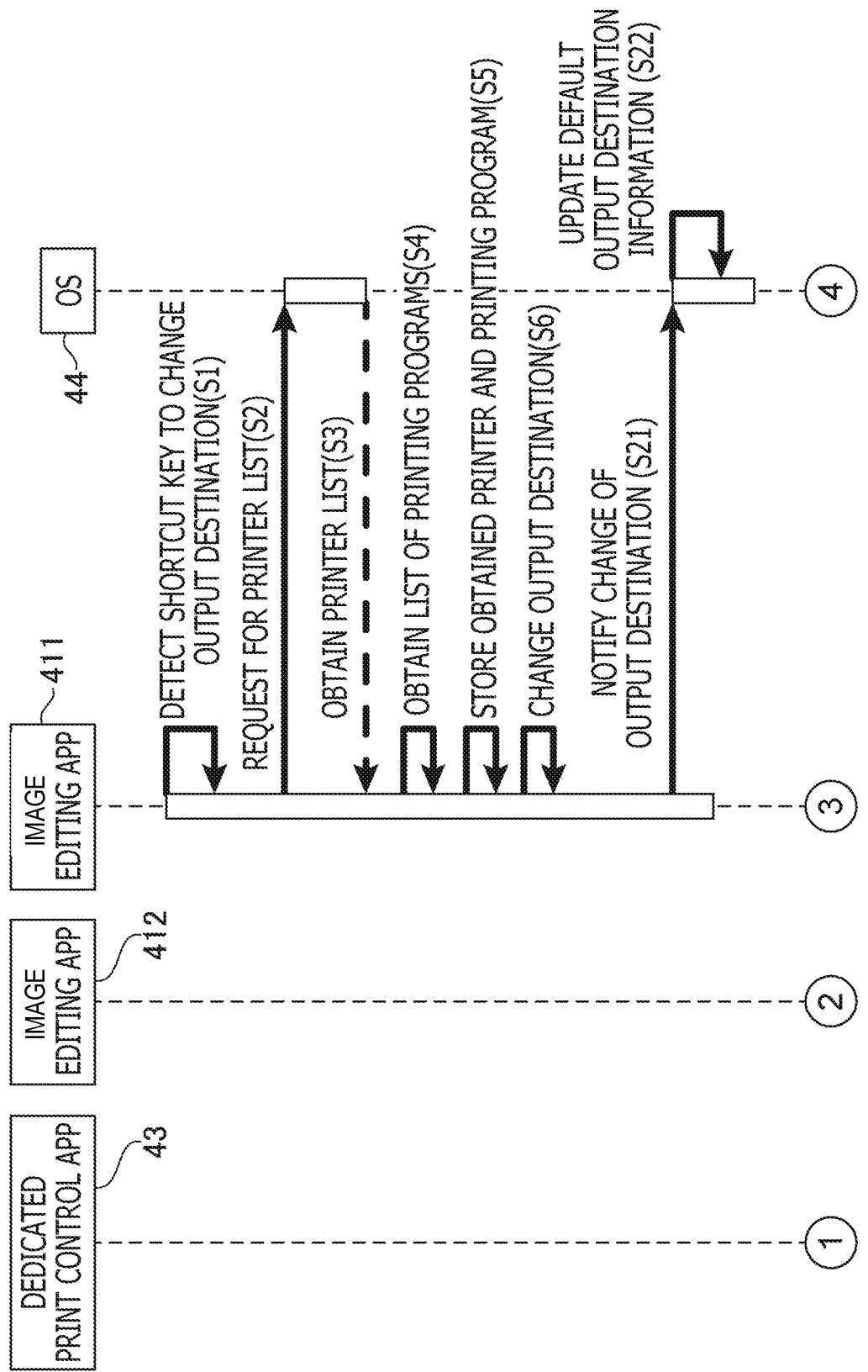

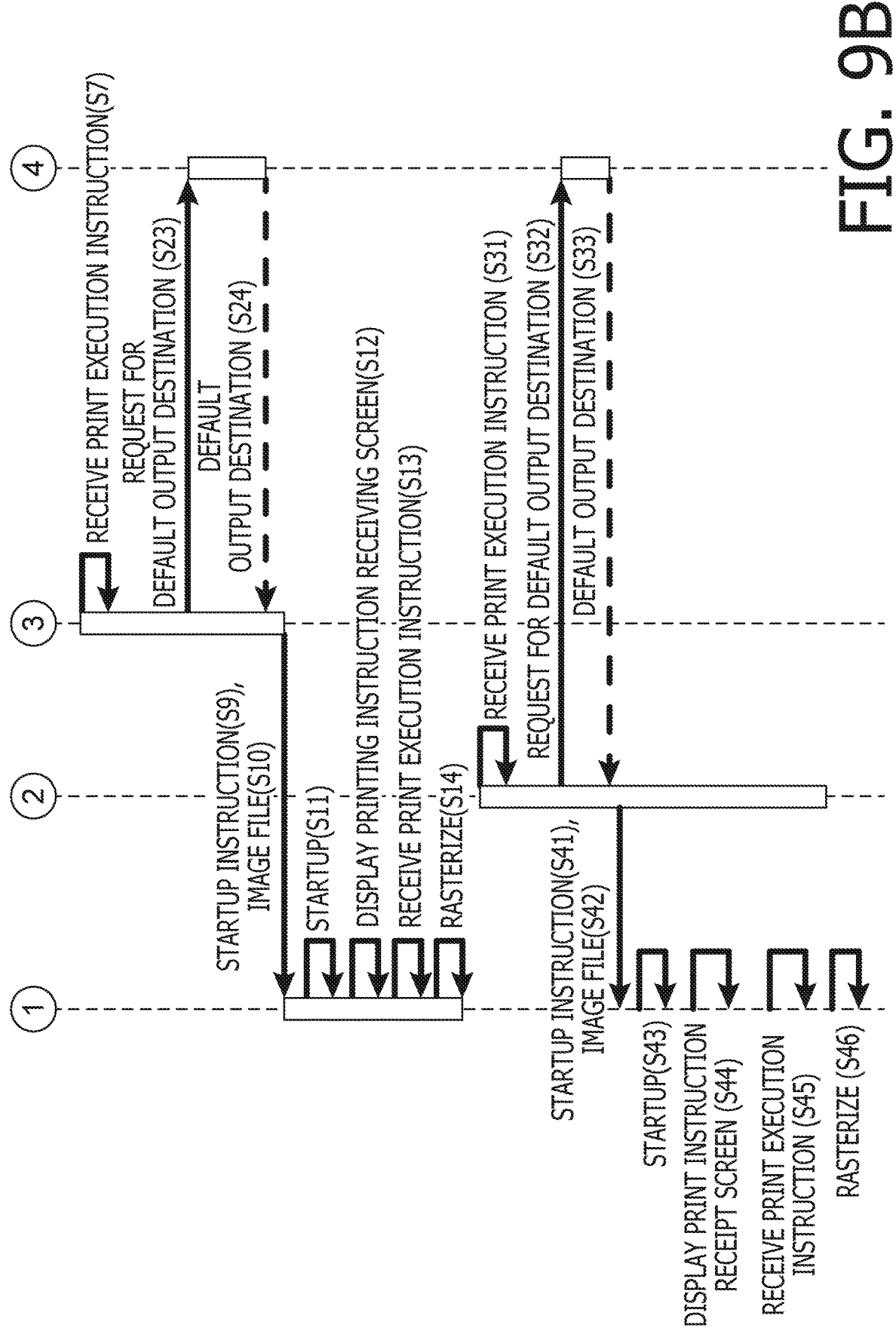

NON-TRANSITORY COMPUTER-READABLE RECORDING MEDIUM STORING COMPUTER-EXECUTABLE INSTRUCTIONS FOR INFORMATION PROCESSING DEVICE, AND METHOD OF CONTROLLING INFORMATION PROCESSING DEVICE

CROSS-REFERENCE TO RELATED APPLICATIONS

This application claims priority under 35 U.S.C. § 119 from Japanese Patent Application No. 2018-066688 filed on Mar. 30, 2018. The entire subject matter of the application is incorporated herein by reference.

BACKGROUND

Technical Field

The present disclosures relate to an application program configured to receive a print instruction. More particularly, the present disclosures relate to selection of printers through the application program.

Related Art

In a field of an information processing device which is provided with input devices such as a keyboard and a touch panel, there has been known a technique in which, when a particular user operation is detected, a particular process associated with the particular user operation is executed. For example, there has been known an information processing device in which a plurality of shortcut keys such as a shortcut key for switching a selection status of an application program are defined.

SUMMARY

When a printer job is transmitted from the information processing device to the printer, an operation to select a printer which is an output destination becomes necessary. When a printer which is not supported by the operating system of the information processing device is to be selected as the output destination, a dedicated print program for the printer should be started. Such an operation is troublesome for the user. There is known an information processing device which is configured to switch a selection status of currently running application with use of a shortcut key. However, in such an information processing device, a selection operation to select a printer which is to output the print job has not been suggested conventionally and an improvement is desired.

According to the present disclosures, there is provided a non-transitory computer-readable recording medium for an information processing device having a memory and a controller, the recoding medium storing computer-executable instructions which cause, when executed, the controller to perform a printer obtaining process of obtaining a list of printers registered with an operating system installed to the information processing device, a program obtaining process of obtaining a list of print programs installed in the information processing device, a storing process of storing identifiers of the printers listed in the list of printers obtained in the printer obtaining process and identifiers of the print programs listed in the list of the print programs obtained in the program obtaining process in the memory, a first detecting process of detecting whether a first user operation is input through an inputting device of the information processing device. When the controller detects input of the first user operation in the first detecting process, the instructions causes the controller to perform an output destination changing process of extracting one of the printers in the list of printers and print programs in the list of print programs stored in the memory and set the extracted one of the printers and the print programs to the output destination, while when the output destination set in the output destination changing process is one of the print programs installed in the information processing device, the instructions cause the controller to start the print program.

According to aspects of the present disclosures, there is provided a method of controlling an information processing device having a memory, including obtaining a list of printers registered with an operating system installed to the information processing device, obtaining a list of print programs installed in the information processing device, storing identifiers of the printers listed in the list of printers as obtained and identifiers of the print programs listed in the list of the print programs as obtained in the memory, detecting whether a first user operation is input through an inputting device of the information processing device, when input of the first user operation is detected, extracting one of the printers in the list of printers and print programs in the list of print programs stored in the memory and setting the extracted one of the printers and the print programs to the output destination, and when the output destination is one of the print programs installed in the information processing device, starting the print program.

BRIEF DESCRIPTION OF EMBODIMENTS

FIGS. 9A and 9B show a sequential chart illustrating a printing operation of a print system according to a second embodiment of the present disclosure.

DETAILED DESCRIPTION OF THE EMBODIMENTS

Hereinafter, referring to the accompanying drawings, an application program embodying aspects of the present disclosures will be described.

First Embodiment

Hereinafter, a print system including 100 a printing device and an information processing device, which are communicatable with each other, according to a first embodiment will be described.

Figure 1:
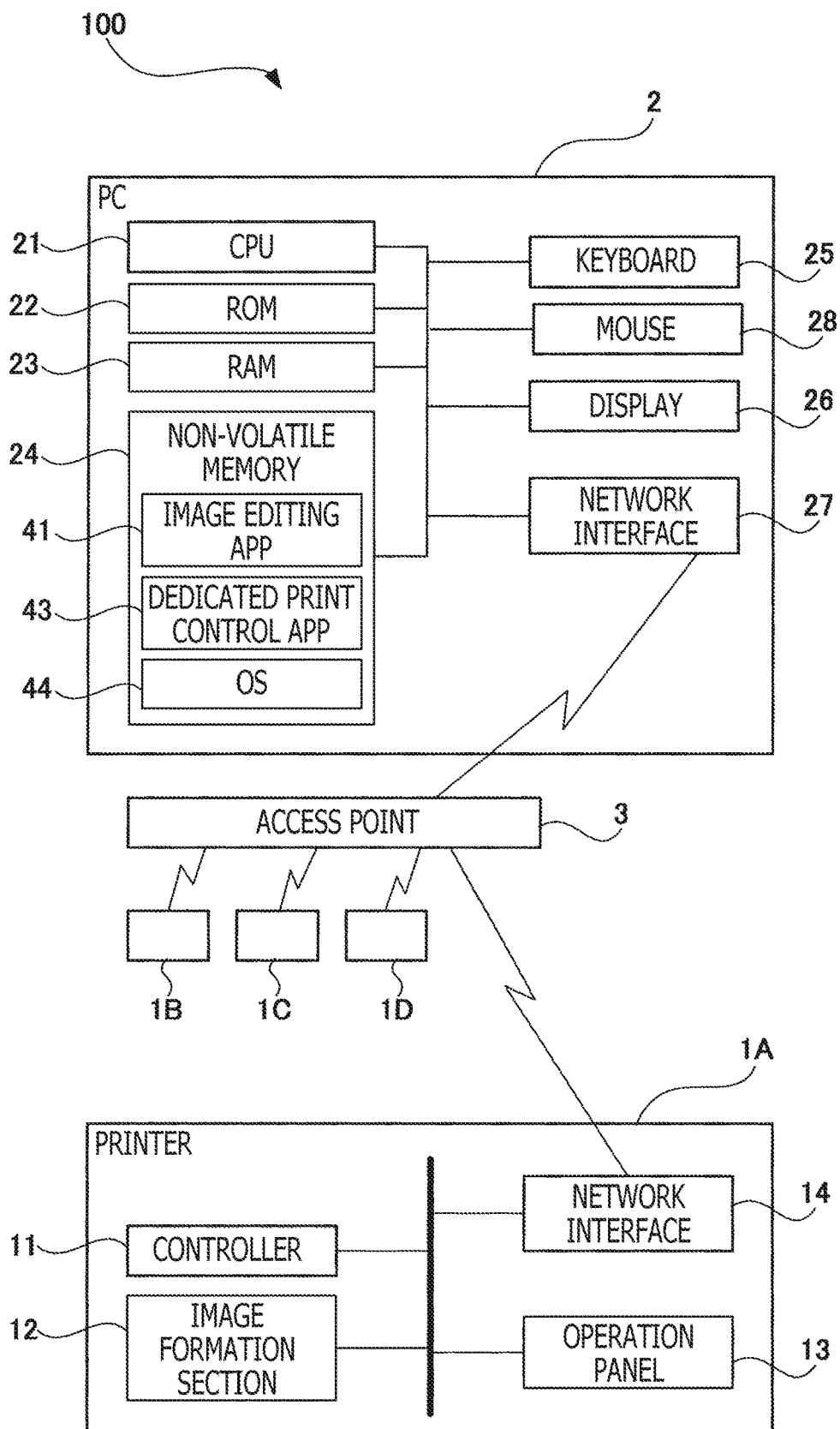
FIG. 1 is a block diagram schematically showing a print system according to a first embodiment of the present disclosures.

As shown in FIG. 1, the print system 100 according to the first embodiment has multiple printers 1A, 1B, 1C, 1D and PC (s personal computer) 2, which are communicatably connected with each other. Each of the printers 1A, 1B, 1C and 1D is configured to perform printing on a medium which is an objective medium. Examples of such a device is a label printer, a page printer, a copier and an MFP (multi-function peripheral). In the following description, the printers 1A, 1B, 1C and 1D are collectively referred to as a printer 1.

The PC 2 is a device configured to generate and edit image data which is subject to be printed by the printer 1, and to transmit a print instruction and image data to the printer. The PC 2 is an example of an information processing device. It is noted that the number of the printer 1 and the number of the PC 2 constituting the print system 100 may be one or more, respectively.

As shown in FIG. 1, the printer 1 has a controller 11, an image forming section 12, an operation panel 13 and a network interface 14. The controller 11 includes a CPU and a memory, and controls components of the printer 1. It should be noted that the controller 11 in FIG. 1 is a collective name including software and software used for controlling the printer 1.

The image forming section 12 is a component for printing images on the objective medium. An image forming method employed in the image forming section 12 can be an electrophotographic imaging method, an inkjet printing method or any other method. The operation panel 13 includes, for example, a touch panel, which is configured to receive a user input and display information. The operation panel 13 may include various display lamps and buttons. The network interface 14 is an interface for a wireless communication to communicate with the PC 2.

The PC 2 has, as shown in FIG. 1, a CPU 21, a ROM 22, a RAM 23, a non-volatile memory 24, a keyboard 25, a mouse 28, a display 26 and a network interface 27. The RAM 23 is an example of a memory. The keyboard and the mouse 28 are examples of an inputting device. The display 26 is an example of a displaying device.

The ROM 22 stores a startup program to start up the PC 2 and the like. The RAM 23 is used as a work area and a storage area to temporarily store data when respective processes are performed. The non-volatile memory 24 is configured by, for example, an HDD and/or flash memory, and stores programs and data. For example, the non-volatile memory 24 stores an application program for editing an image (i.e., an image editing APP) 41, a dedicated print control APP 43 and an operation system (OS) 44. The image editing APP 41 is an example of an application program. The dedicated print control APP 43 is an example of a print program.

The CPU 21 performs respective processes in accordance with programs retrieved from the ROM 22 or the non-volatile memory 24. The keyboard 25 has a plurality of keys and receives input of characters or the like as respective keys are operated.

The keyboard 25 receives the user input of instructions to cause the OS 44 or a program to perform a particular process when a particular key is depressed or particular keys are depressed simultaneously. For example, the keyboard 25 can receive an input operation of shortcut keys.

The mouse 28 is an input device with which the user indicates a moving amount and a moving direction. The display 26 displays information. The network interface 27 is hardware configured to communicate with the printer 1.

According to the print system 100, the PC 2 and printer 1 perform a wireless communication compliant with Wi-Fi® standard through a common access point 3. That is, both the network interfaces 14 and 27 are interfaces enabling the wireless communication compliant with the Wi-Fi standard. More particularly, the network interfaces 14 and 27 are interfaces enabling the wireless communication compliant with IEEE 802.11 standard and a standard corresponding the IEEE 802.11 standard. It is noted that the communication mode according to the present embodiment is only an example and aspects of the present disclosure should not be limited to the configuration of the present embodiment. For example, the PC 2 and the printer may communicate with each other with the wireless communication directly established therebetween, not through the access point 3, or with a wired communication.

Figure 2:
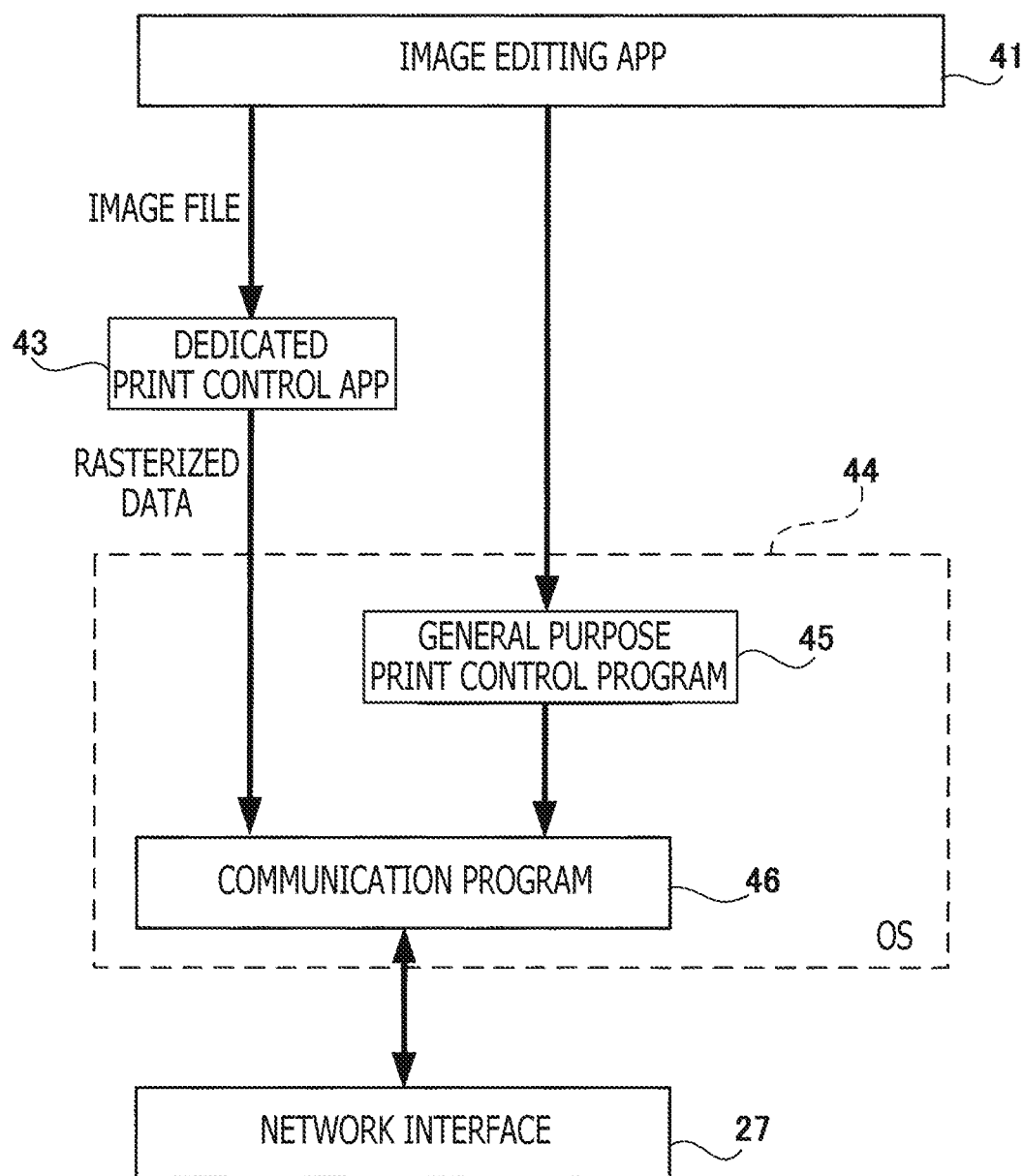
FIG. 2 illustrates a program for printing of an information processing device.

In the non-volatile memory 24 of the PC 2, as shown in FIG. 2, the OS 44, the image editing APP 41, the dedicated print control APP 43 and the like can be stored. Further, in the OS 44 of the PC 2, a general purpose print controlling program 45 and a communication program 46 are implemented. It is noted that, in FIG. 2, directions in which respective pieces of data flow are indicated by arrows with solid lines.

The image editing APP 41 is a program having functions of receiving user's instructions and displaying images, editing and storing images. The image editing APP 41 is a program used for editing images, generating and editing of an image file of an edited image. The image file is data file to be printed out on a printing medium. The image editing APP 41 also has functions of receiving a print instruction and a setting regarding an output destination when printing.

The dedicated print control APP 43 is a program having functions of receiving a print instruction, generating raster data by rasterizing image data contained in a image file, transmitting the generated rasterized data to the printer 1 through the communication program 46. The dedicated print control APP 43 is a dedicated program compliant only with a printing device of a particular model, and does not compliant with printing devices other than the devices of the particular model (e.g., printing devices of a make different from the manufacture of the printing device of the particular model).

The dedicated print control APP 43 according to the present embodiment is a dedicated program for controlling the printer 1. Accordingly, the dedicated print control APP 43 generates the rasterized data compliant with all of detailed print settings and the printer can print out.

The general purpose print control program 45 is a program having functions of generating standard data for printing compliant with a particular printing standard and transmitting the generated standard data to the printer 1 through the communication program 46. The general purpose print control program 45 is a standard program presented by the OS 44 to realize a print controlling function. The standard data transmitted by the general purpose control program 45 is data compliant with a standard appropriate for general purpose rasterizing process but not rasterized.

The general purpose print control program 45 is a general purpose program compliant with various types of printing devices supporting the particular print standard. Therefore, if a printing device has a function supporting the general purpose print control program 45, the printing device can perform printing based on the standard data regardless of the manufacturer of the printing device. Since the general purpose print control program 45 is a general purpose program compliant with a plurality of models, the receivable print settings are limited to general ones. Therefore, the general purpose print control program 45 does not necessarily accept all the print settings executable by the printer 1. As printing systems making use of the general purpose print control program 45, AirPrint® and Mopria® are known.

When the image data subject to be printed is delivered to the dedicated print control APP 43, the image editing APP 41 uses an image file, and adds all the designated print settings. On the other hand, when the image data subject to be printed is delivered to the general purpose print control program 45, the image editing APP 41 uses data file which is generated by modifying the image file to have a format appropriate for generalization. In this case, the image editing APP 41 adds only general print settings.

The communication program 46 is a program having a function of controlling the network interface 27 to perform a communication with a communication counterpart device. For example, the dedicated print control APP 43 registers the generated rasterized data with a spooler of the OS 44. The communication program 46 of the PC 2 transmits the data registered with the spooler to the printer 1 through the network interface 27. The communication program 45 is also a standard program provided by the OS 44. It is noted that a part of the communication program 46 may be stored in the ROM 22.

Figure 3:
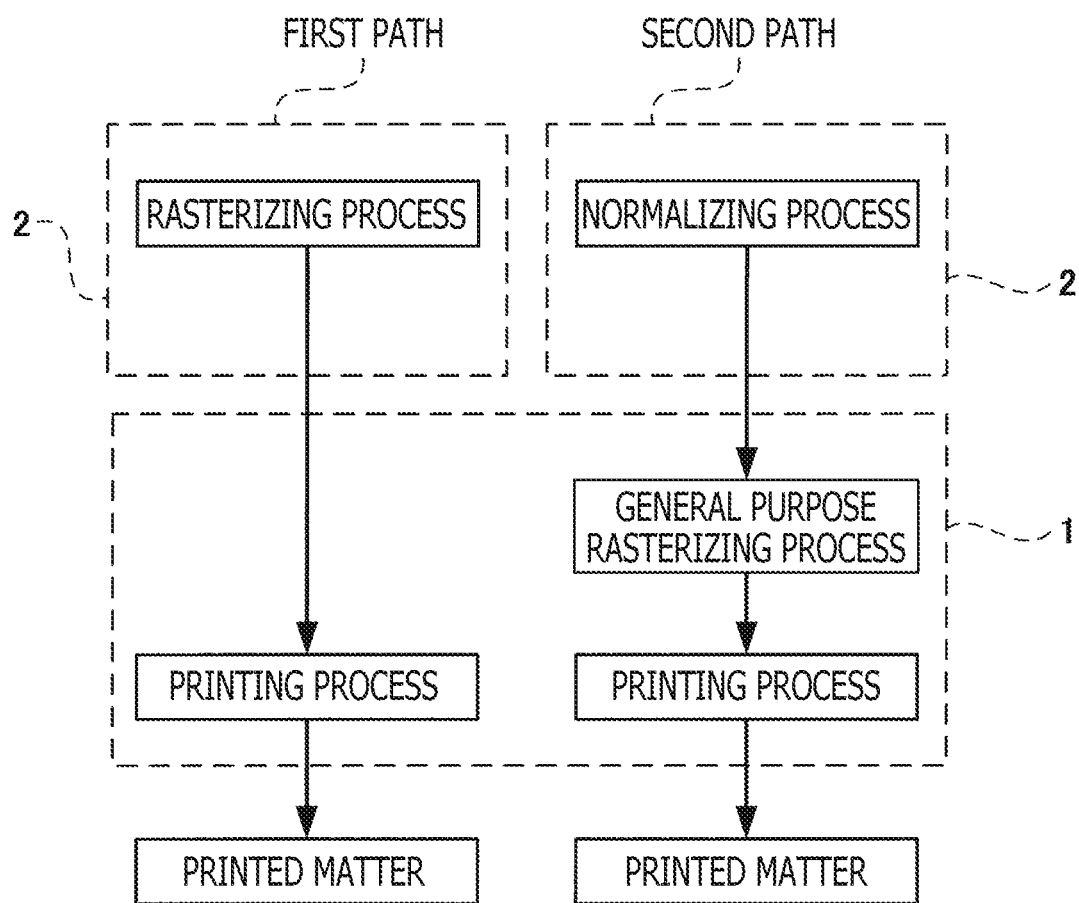
FIG. 3 illustrates two kinds of printing paths.

The print system 100 according to the embodiment, as shown in FIG. 3, there are two kinds of paths as printing paths in which the printer 1 is caused to perform printing. The two printing paths include a first path in which the PC 2 performs the rasterizing process, and a second path in which the printer 1 performs the rasterizing process.

When causing the printer 1 to perform printing in the first path, as shown in FIG. 3, the image editing APP 41 starts up the dedicated print control APP 43 and delivers an image file to the dedicated print control APP 43. The dedicated print control APP 43 performs the rasterizing process to rasterize the image data contained in the image file, and transmits the rasterized data to the printer 1 through the communication program 46 of the OS 44. The printer 1 receives the rasterized data in which the image data has been rasterized and performs printing based on the received rasterized data. In the first path, the PC 2 rasterizes the image data subject to be printed with use of the dedicated print control APP 43 shown in FIG. 2.

Since the dedicated print control APP 43 is used, the first path corresponds to all the print settings applicable to the printer 1. The dedicated print control APP 43 is not included in the OS 44. Therefore, when printing in accordance with the first printing path is performed, the PC 2 does not use the print control function (e.g., the general purpose print control program 45).

When causing the printer 1 to perform printing in the second path, as shown in FIG. 3, the image editing APP 41 delivers the general purpose image file to the OS 44. The OS 44 performs standardization of image data contained in the general purpose image file in a standardization process, and transmits the standardized data to the printer 1. The printer 1 performs the general purpose rasterizing process for rasterizing the standardized data, and perform printing, in the general purpose rasterizing process, based on the rasterized data. That is, in the second path, a printer capable of performing the general purpose rasterizing process. In the second path, the PC 2 standardizes the objective data with use of the general purpose print control program shown in FIG. 2.

Since the general purpose print control program 45 which is the print control function contained in the OS 44, the second path is not necessarily compliant with all the print settings compatible with the printer 1. For example, the general purpose print control program 45 is not compatible with high-resolution print settings corresponding to only a particular model. Therefore, for printing in the second path, the resolution compatible to many models, that is, print settings other than the high resolution is used.

As described above, in the first path and the second path, rasterization of the objective image data is performed by different processing entities, respectively. That is, in the first path, the rasterization is performed by the PC 2, while the rasterization is performed by the printer 1 in the second path. Further, the first path and the second path employ different rasterization algorithms, and there is a possibility that processing results are different depending on the rasterization algorithms used. Specifically, in the first path, the rasterization compliant with detailed print settings are performed, while, in the second path, the rasterization is performed such that some of the print settings are restricted. Further, in the first and second paths, types and formats of data transmitted from the PC 2 to the printer 1 are different. Therefore, even if printing is performed based on the same image file, different printing results may be obtained.

The image editing APP 41 according to the present embodiment defines a shortcut key for instructing change of the output destination, and not only the printer 1 but also the dedicated print control APP 43 are included as a changing target of the output destination. For example, when the printer 1A does not support the general purpose rasterizing process, while the printers 1B-1D support the general purpose rasterizing process, the image editing APP 41 can cause any of printers 1B-1D to execute a print job in the second path, but cannot cause the printer 1A to execute the print job in the second path. Therefore, when executing printing with use of the printer 1A, the image editing APP 41 needs to start up the dedicated print control APP 43 corresponding to the printer 1A, and cause the printer 1A to execute the print job with use of the first path. In general, the dedicated print control APP 43 is started when the user inputs a startup instruction of the dedicated print control APP 43 (e.g., by clicking a startup icon displayed on a desktop).

In addition to the above-described startup method, the image editing APP 41 also supports another startup method. That is, the image editing APP 41 defines a shortcut key associated with a process of changing the output destination. The image editing APP 41 stores a list of candidates of the output destination, and every time when the shortcut key is operated, the candidates of the output destination is selectively switched sequentially. It is noted that not only the printers 1B-1D but also the dedicated print control APP 43 installed in the PC 2 are included as one of the candidates of the output destination. Therefore, according to the image editing APP 41, by operating the shortcut key, the output destination can be changed to the dedicated print control APP 43 without operating the startup icon on the desktop. Then, when the print instruction is input in a state where the output destination is set to the dedicated print control APP 43, the image editing APP 41 starts up the dedicated print control APP 43.

The shortcut key is set, for example, by combining a print execution shortcut key used to input a command instructing to start printing with another key. That is, the shortcut key defined by the image editing APP 41 includes the print execution shortcut key so that the user can easily recognize that processes executed by operating the shortcut keys are print-related processes. For example, when the shortcut key for executing printing is "Command"+"P", the image editing APP 41 defines that a combination of "Command"+"Alt"+"P" as a shortcut key for instructing change of the output destination. It is noted that "A"+"B" means that an "A" key and a "B" key are operated simultaneously. A simultaneous operation of the "Command" key, the "Alt" key and the "P" key (i.e., "Command"+"Alt"+"P") is an example of a first user operation. A simultaneous operation of the "Command" key and the "P" key (i.e., "Command"+ "P") is an example of a second user operation, and an operation of "Alt" key is a third user operation.

Next, a printing operation by the printing system 100 according to the present embodiment will be described, referring to FIGS. 4-6. In the following description, it is assumed that the printer 1A does not support the general purpose rasterizing process, and is not registered with the OS 44. It is further assumed that the printers 1B-1D support the rasterizing process and are registered with the OS 44. It is also assumed that the dedicated print control APP 43 corresponds to the printer 1A.

When the user intends to make the printing system 100 perform printing based on the image file, the user starts up the image editing APP 41 on the PC 2 and edits image data. As shown in FIG. 4, when the simultaneous operation of "Command", "Alt" and "P" keys of the keyboard 25 are detected when the image editing APP 41 is in an active state (S1), the image editing APP 41 requests the OS 44 to transmit a list of printers 1 registered with the OS 44 (S2). When the list of the printers 1 are obtained from the OS 44 (S3), the image editing APP 41 obtains a list of print programs installed in the PC 2 (S4). It is noted that, in the print programs, the dedicated print control APP 43 is included.

Thereafter, the image editing APP 41 stores the list of the printers 1 obtained in S3 and the list of the print programs obtained in S4 in the RAM 23 (S5). It is noted that such lists may be stored in the non-volatile memory 24. Thereafter, the image editing APP 41 receives change of the output destination (S6). Change of the output destination is performed by automatically selecting, from among the list of the printers 1 obtained in S3 and the list of the print programs obtained in S4, a printer 1 or a print program.

Figure 5:
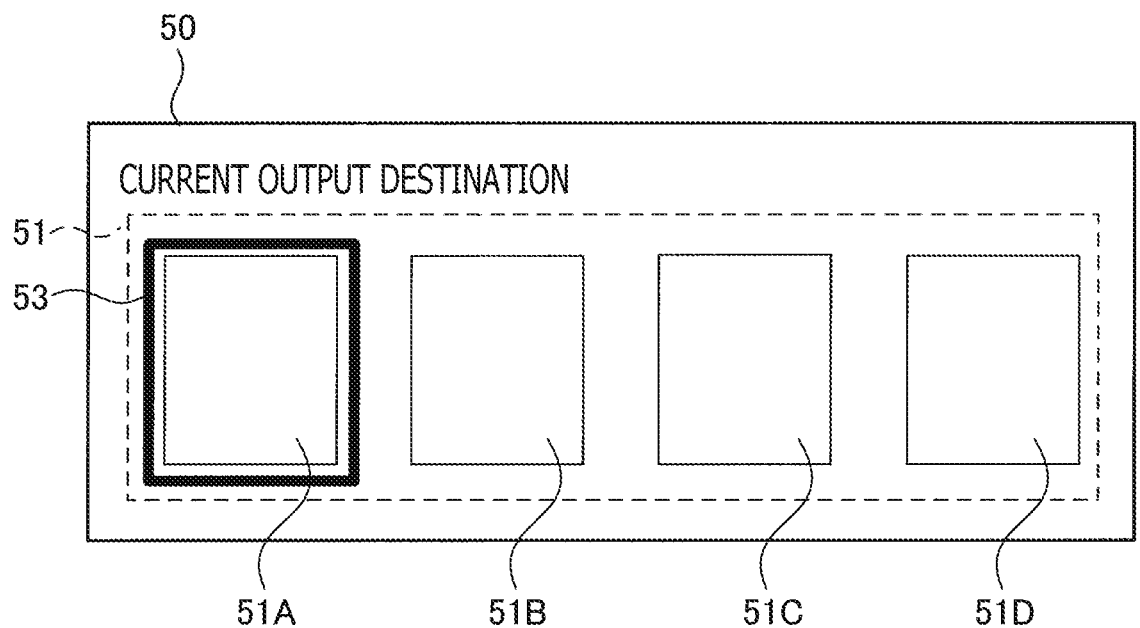
FIG. 5 shows an example of an output destination changing screen.

For example, change of the output destination is displayed on an output destination changing screen 50 as shown in FIG. 5. In an output destination list 51, the printers 1 registered with the OS 44 and the applications installed in the PC 2 are listed. For example, an icon indicating the dedicated print control APP 43 is displayed in an area 51A, an icon indicating the printer 1B is shown in an area 51B, an icon indicating the printer 1C is shown in an area 51C and an icon indicating the printer 1D is shown in an area 51D. A selection cursor 53 is for indicating the output destination set to the image editing APP 41 from among the output destinations in the output destination list 51. Every time when the simultaneous operation of the "Command", "Alt" and "P" keys of the keyboard 25 is detected, the image editing APP 41 moves the selection cursor 53 sequentially so that the output destination is switched among the icons indicated in the output destination list 51. As described above, when the simultaneous operation of the "Command", "Alt" and "P" keys of the keyboard 25 is detected, the image editing APP 41 extracts one output destination from among the plurality of output destinations in the output destination list 51 and sets the same to the current output destination, thereby the output destination being changed. It is noted that the above configuration may be modified such that only the currently selected output destination is displayed on the output destination changing screen 50 without displaying the output destination list 51.

Figure 4:
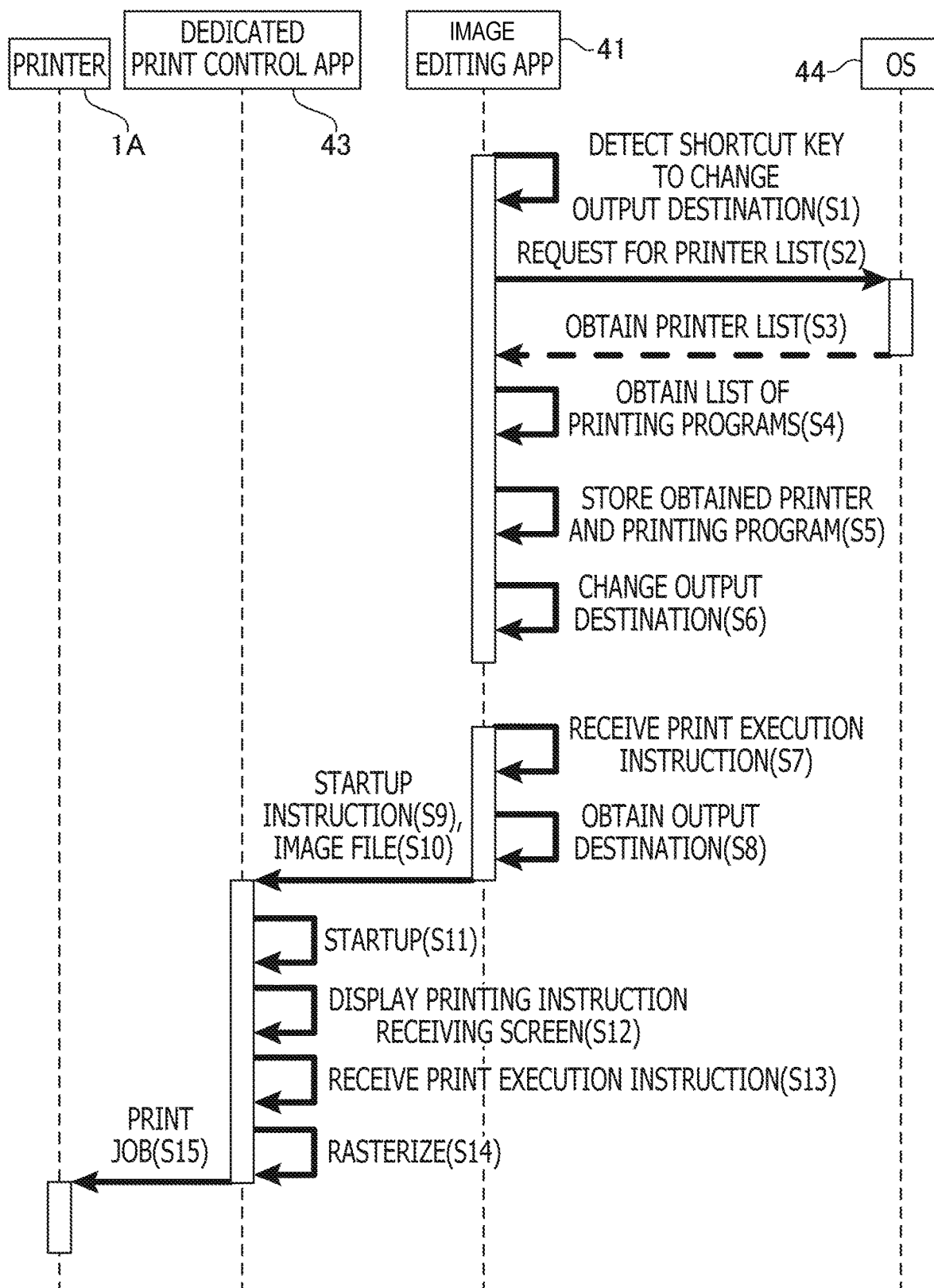
FIG. 4 is a sequential chart illustrating a printing operation.

It is noted that S4 in FIG. 4 can be executed before S2. When the list of the printers 1 and the list of the print programs have already been obtained and stored in the RAM 23, the process of S2-S5 may be omitted. The process in S2-S5 may be executed when the image editing APP 41 is started up. In such a case, after execution of S1, only S6 is executed. When only one printer or one printing program has been stored in the RAM 23 in S5, the image editing APP 41 does not change the output destination.

Figure 6:
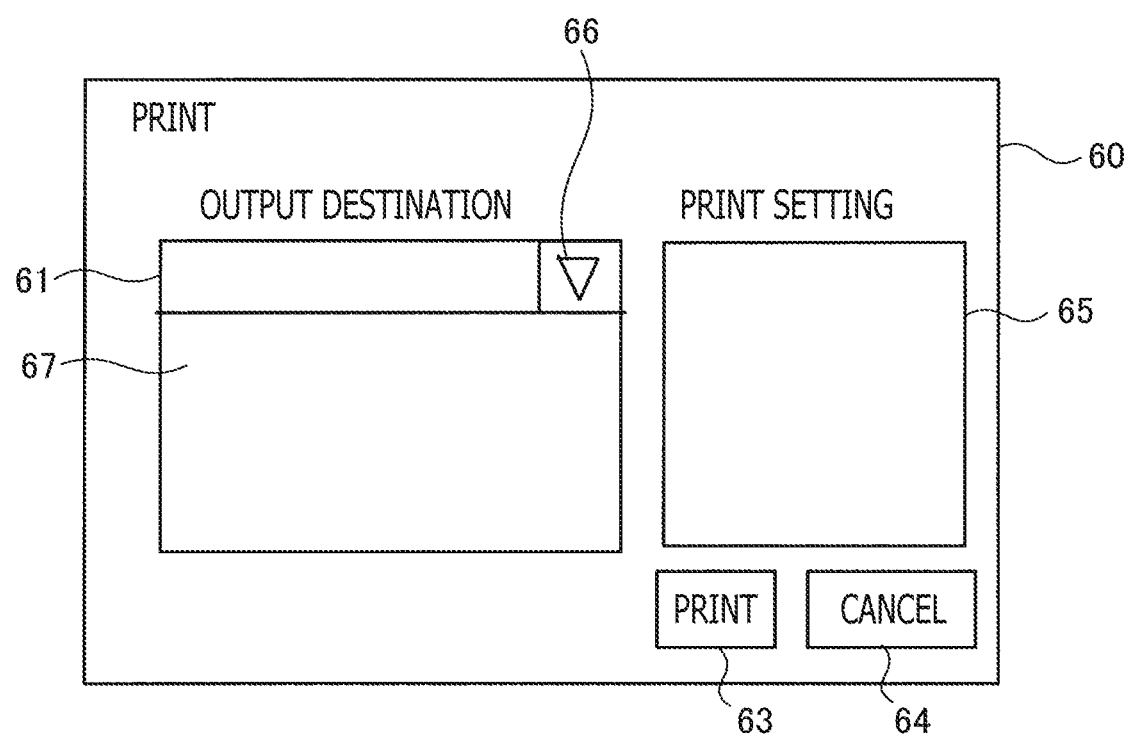
FIG. 6 shows an example of a print screen.

After the output destination has been changed, by detecting the simultaneous operation of the "Command" and "P" keys of the keyboard 25 with the image editing APP 41 being in an active state, the image editing APP 41 displays a print screen 60 as shown in FIG. 6 on the display 26. On the print screen 60, for example, an output destination displaying field 61, a print button 63, a cancel button 64 and a print setting field 65 are displayed.

On the output destination displaying field 61, the output destination currently selected by the image editing APP 41 is displayed. In the output destination displaying field 61, a change button 66 to change the output destination is displayed. When an operation of the change button 66 is detected, the image editing APP 41 displays a selection list 67. In the selection list 67, the printers 1 registered with the OS 44 are displayed. When a print program is selectable as the output destination, the image editing APP 41 also displays the print program in the selection list 67. For example, when the dedicated print control APP 43 (which is configured to use the printer 1A: hereinafter, indicated as w/printer 1A) is currently set as the output destination, the image editing APP 41 displays the printers 1B-1D and the dedicated print control APP 43 (w/printer 1A) in the selection list 67 when the operation of the change button 66 is detected. Therefore, even when the output destination has been set to the dedicated print control APP 43 (w/printer 1A) before printing, the image editing APP 41 can change the output destination, at the time of printing (immediately before printing), from the dedicated print control APP 43 (printer 1A) to, for example, the printer 1B.

The print setting field 65 is for setting various print items. The print button 63 is a button through which a print execution instruction is input. The cancel button 64 is a button through which a print termination instruction is input.

For example, when an operation of the print button 63 is detected with the dedicated print control APP 43 (w/printer 1A) being displayed in the output destination display field 61, the image editing APP 41 receives a print execution instruction using the dedicated print control APP 43 (w/printer 1A) (S7). Then, the image editing APP 41 obtains the dedicated print control APP 43 (w/printer 1A) as the output destination (S8). Then, the image editing APP 41 transmits a startup instruction (S9) to the dedicated print control APP 43 obtained in S8. At this stage, the image editing APP 41 delivers currently editing image file to the dedicated print control APP 43 (S10). The image file is an example of a print job.

The dedicated print control APP 43 is started up in accordance with the startup instruction received from the image editing APP 41 (S11). The dedicated print control APP 43 displays a print instruction reception screen (S12), and when the print execution instruction is received through the print instruction reception screen (S13), the dedicated print control APP 43 rasterizes the image file delivered by the image editing APP 41 (S14) and transmits the print job to the printer 1A (S15). That is, the image editing APP 41 causes the printer 1A to print the image file using the first path.

In contrast, when detecting the operation of the print button 63 with the printer 1B being displayed on the output destination display field 61, the image editing APP 41 receives a print execution instruction using the general purpose control program 45 (S7). Then, the image editing APP 41 obtains, as the output destination, the printer 1B (S8). Then, the image editing APP 41 outputs the edited image file to the printer 1B through the general purpose control program 45. The printer 1B rasterizes the currently edited image file, and performs printing. That is, the image editing APP 41 causes the printer 1B to print the image file through the second path.

As described above, the PC 2 is configured such that, when the image which is to be edited with use of the image editing APP 41, the user operates the shortcut key (i.e., the simultaneous operation of the "Command", "Alt" and "P" keys) of the keyboard 25. According to this configuration, the PC 2 can set the dedicated print control APP 43 which has not been registered with the OS 44 as the output destination and start up the same. Accordingly, the PC 2 enables the user to perform a selection of the printer 1A, or a startup operation of the dedicated print control APP 43 easily. Thus, the print selection operation to output the print job to the printer 1A can be simplified.

Next, referring to a flowchart shown in FIG. 7, a printing process executed by the PC 2 to realize the afore-mentioned printing operation in the print system 100 will be described. the printing process is executed by the CPU 21 of the PC 2 in response to the operation of the shortcut key (i.e., the simultaneous operation of the "Command", "Alt" and "P" keys) during execution of the image editing APP 41, that is, in response to detection of the output destination switching command to switch the output destinations. The printing process is a process included in the image editing APP 41. It is noted that a process of detecting the output destination switching command based on the operation of the shortcut key (i.e., the simultaneous operation of the "Command", "Alt" and "P" keys) is an example of the first detecting process.

Figure 7:
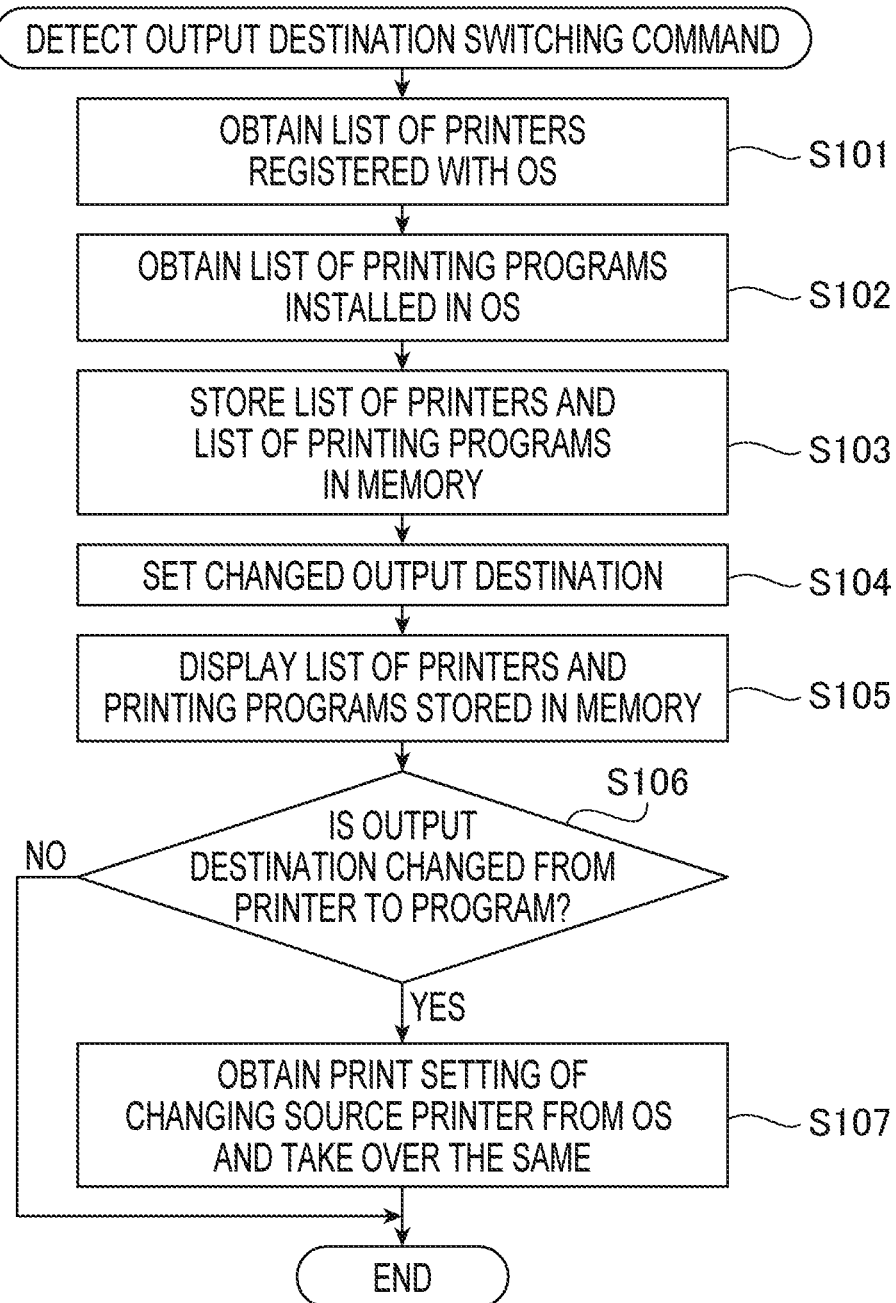
FIG. 7 is a flowchart illustrating an output destination changing process.

In FIG. 7, the CPU 21 firstly obtains a list of the printers 1 registered with the OS 44 from the OS 44 (S101). Then, the image editing APP 41 obtains all the printers 1 which can perform printing in the second path, regardless of manufactures of the printers. Further, the CPU 21 obtains a list of the print programs installed in the PC 2 from the non-volatile memory 24 (S102). The print program includes the dedicated print control APP 43. The list of the print programs may be obtained, for example, from the OS 44, or may be obtained referring to a particular directory storing the print programs. As above, the image editing APP 41 obtains all the printers 1 capable of performing printing in the first path. It is noted that an execution order of S101 and S102 may be reversed. A process of S101 is an example of a printer obtaining process, and a process of S102 is an example of a program obtaining process.

Thereafter, the CPU 21 stores the list of the printers 1 obtained in S101 and the list of the print programs obtained in S102 in the RAM 23 (S103). Concretely, for example, the CPU 21 stores identifiers of the printers 1 listed in the list and obtained in S101 and identifiers of the print programs listed in the list obtained in S102 in an array defined in the RAM 23. Step S103 is an example of a storing process.

Then, the CPU 21 extracts one printer or one print program from among the printers 1 and the print programs based on the identifiers thereof stored in the RAM 23, and set the same to a changed output destination (S104). For example, in the array defined in the RAM 23, an output destination which is listed next to the output destination before the change is extracted (based on the identifiers). Then, the names of the printers 1 and print programs stored in the array are identified based on the identifiers and displayed on the display 26 as a list (S105). Concretely, the CPU 21 extracts the identifiers of the printers 1 and print programs stored in the array, and displays the names corresponding to all the extracted identifiers on the output destination changing screen 50 in the order of arrangement in the array. It is noted that the CPU 21 may display each particular numbers of output destinations in the arranged order in the array. Alternatively, the CPU 21 may display the output destinations one by one in the arranged order in the array. Steps S104 and S105 are examples of the output destination changing process.

The CPU 21 may adjust the array of the printers 1 and the print programs. For example, the CPU 21 may store execution history of print jobs in the non-volatile memory 24. Then, when the printers 1 and the print programs (i.e., the identifiers thereof) are arranged in the array, the CPU 21 may arrange the same in a descending order of usage frequency thereof based on the execution history. According to such a configuration, the printers 1 or the print programs of which usage frequencies are high are arranged at higher hierarchy and the user can select the same easily. That is, the user operability in setting the output destination is improved. In the above description, the execution history is managed by the image editing APP 41, but the execution history may be managed by the OS 44.

When a particular printing medium is selected as a type of the printing medium, the CPU 21 excludes, from among the printers 1 and print programs stored in the RAM 23 (i.e., stored in the array), ones which cannot perform printing on the particular printing medium so that they are not displayed on the output destination changing screen 50 shown in FIG. 5. For example, when the image editing APP 41 generates an image file, and the printing medium should have a large size (e.g., A3 size), if the user inadvertently sets a printer 1 which cannot print a large-size image as the output destination, that printing may be failed. Therefore, the CPU 21 excludes the printers 1 (e.g., the printer 1C or 1D) or printing programs which cannot print a large-size image from candidates to be extracted as the output destinations. According to such a configuration, only printers which can print large-size images appropriately are displayed on the output destination changing screen 50. Therefore, it becomes possible for the user to avoid selecting inappropriate printers, and to avoid failure of printing.

The CPU 21 determines whether the output destination is changed from the printer 1 to the print program (S106). When the output destination is changed from the printer 1 to the print program (S106: YES), the CPU 21 obtains, from the OS 44, print settings of a change source printer 1 and apply the same to the change destination print program (S107). Concretely, the CPU 21 retrieves a file storing default settings of the print program and rewrites the default settings of the print program in accordance with the print settings of the change source printer 1. As the previous print settings for the change source printer 1 are taken over by the print settings of the print program, it is possible to avoid, when the printing is performed with use of the print program, the same print settings are used, and usability of the print program is improved. Thereafter, the CPU 21 terminates the process. Steps S106 and S107 are examples of a take-over process.

When the output destination is not changed from the printer 1 to the print program (S106: NO), the CPU 21 does not execute S107 and terminates the process. For example, when the output destination is changed from a certain print program to a dedicated print control APP 43, or when the output destination is changed from the printer 1C to the printer 1B, the process is terminated without taking over the print settings. It is noted that, at every detection of the output destination switching command to switch the output destination by an operation of the shortcut keys (i.e., "Command", "Alt" and "P" keys), a process of S101-S107 is performed, and switching of the output destinations are performed.

Figure 8:
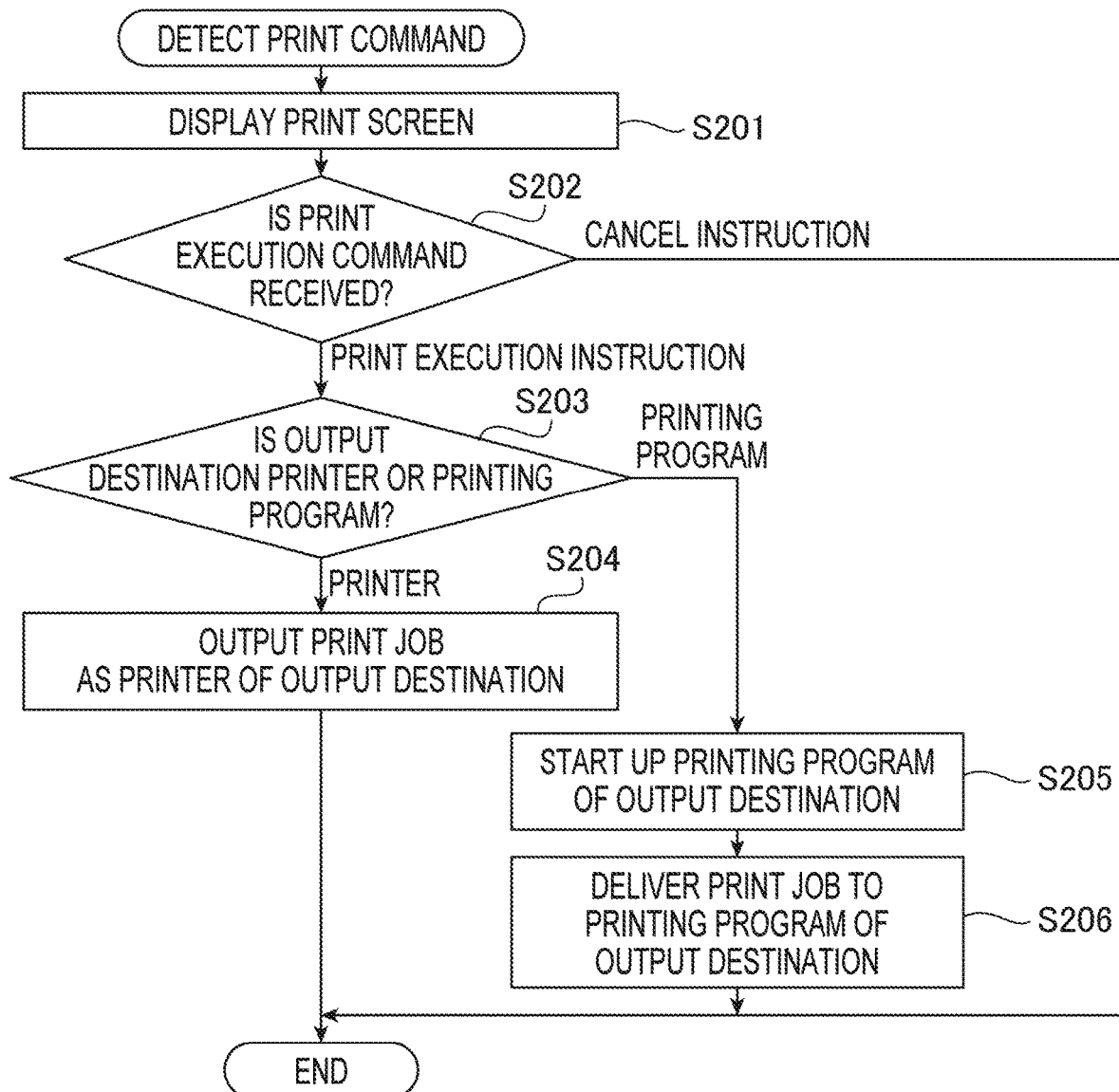
FIG. 8 is a flowchart illustrating a printing process.

When a print command is detected, the image editing APP 41 executes a printing process shown in FIG. 8. For example, when detecting the simultaneous operation of the "Command" key and the "P" key of the keyboard 25, the image editing APP 41 detects the print command. Detection of the print command as the "Command" and "P" keys of the keyboard 25 is an example of a second receiving process.

When detecting the print command, the CPU 12 make the display 26 display a print screen 60 as shown in FIG. 6 on the display 26 (S201). Then, the CPU 21 determines whether the print execution instruction is received (S202). A process of S202 is an example of a first receiving process. When, for example, a cancel button 64 (FIG. 6) is clicked by the mouse 28 and no print instruction is received (S202: cancel instruction), the CPU 21 terminates the process.

When the print button 63 (FIG. 6) is clicked by the mouse 28, the CPU 21 determines that the print execution instruction is received (S202: print execution instruction). In this case, the CPU 21 determines whether the output destination is the printer 1 or the print program (S203).

When it is determined that the output destination is the printer 1 (S203: printer), the CPU 21 output the print job to the output destination (i.e., the printer 1) (S204). For example, when the output destination is set to the "printer 1B", the CPU 21 outputs the print job to the printer 1B through the general purpose print control program 45. The printer 1B rasterizes the print job received from the PC 2 and performs printing. Thereafter, the CPU 21 terminates the process.

When it is determined that the output destination is the print program (S203: print program), the CPU 21 starts up the print program which is selected as the output destination (S205). A process of S205 is an example of a program startup process. For example, when the output destination is set to the "dedicated print control APP 43", the CPU 21 starts up the dedicated print control APP 43. According to this configuration, the user is not required to input the startup instruction for the dedicated print control APP 43 (e.g., to operate a startup icon of the dedicated print control APP 43 displayed on the desktop). That is, with a normal operation of the image editing APP 41, that is, with an operation when printing is performed with use of the print 1B and the like, the user can select the dedicated print control APP 43 and the CPU 21 starts up the dedicated print control APP 43.

Thereafter, the CPU 21 delivers the print jobs such as an image file to the print programs, which has been started (S206), and terminates the same. A process shown in FIG. 8 is an example of a printing process.

The print program that has received the print job (e.g., the dedicated print control APP 43) displays a print instruction receiving screen on the display 26 of the PC 2. In response to the print instruction through the print instruction receiving screen, the print program (e.g., the dedicated print control APP 43) rasterizes the print job and output the same to the printer 1. In response to receipt of the print job from the print program, the printer immediately starts printing.

As described above in detail, the image editing APP 41 stores a list of the printers 1 and the print programs, and when input of the shortcut key (e.g., a simultaneous operation of "Command", "Alt" and "P" keys) is detected, one of the printers 1 and the print programs is selected as an updated output destination. When the updated output destination is one of the print programs installed in the PC 2, the image editing APP 41 starts up the print program. That is, the image editing APP 41 defines a shortcut key for changing the output destination and the print programs are included as candidate output destinations such that the print program can be started by operating the shortcut key. According to this configuration, the image editing APP 41 can make the user easily perform selecting a printer 1 or starting up a print program. Thus, the selection operation of a printer to which the print job is output can be simplified.

Second Embodiment

Figure 10:
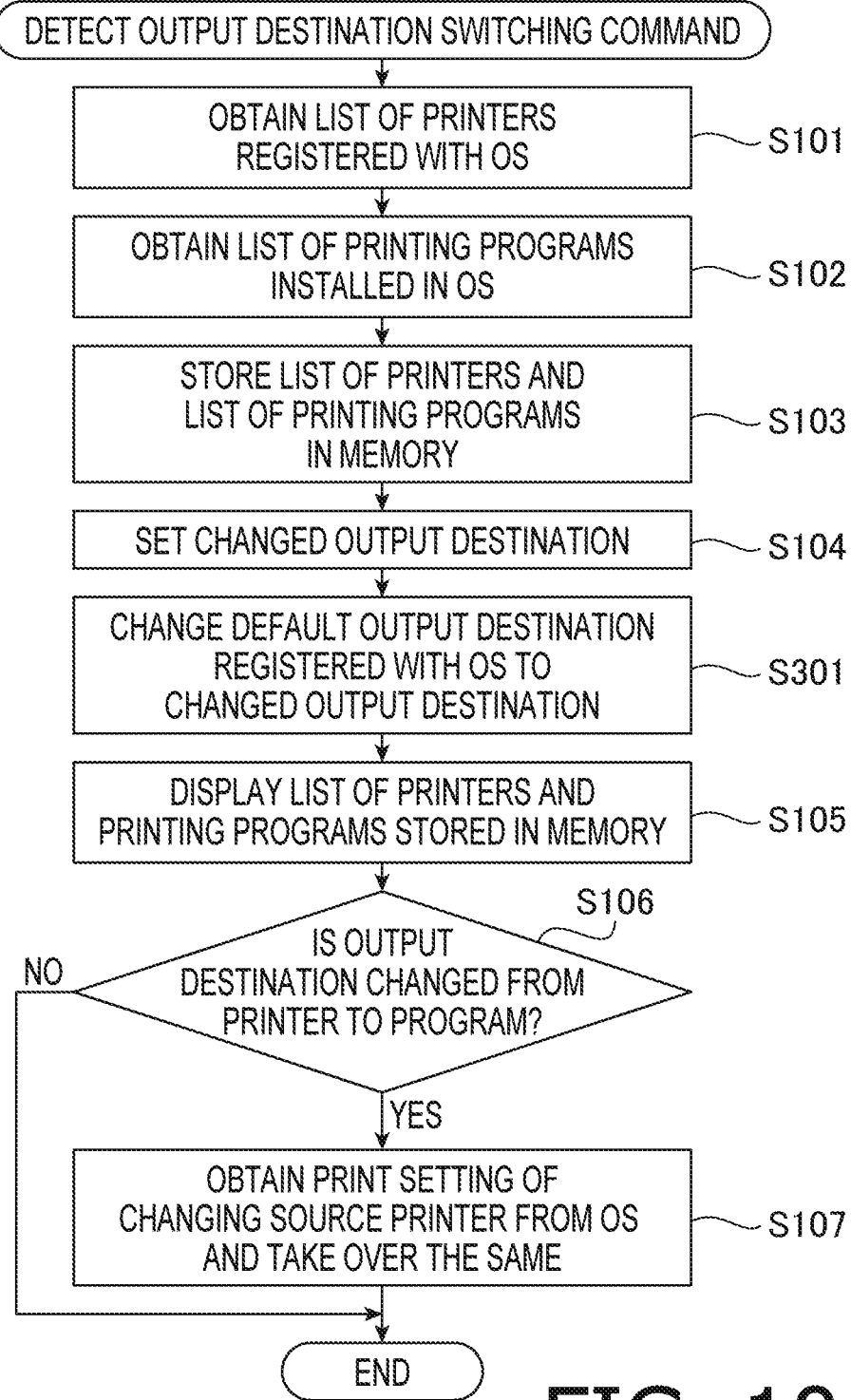
FIG. 10 is a flowchart illustrating an output destination changing process.

Next, a print system according to a second embodiment will be described, referring to FIGS. 9A, 9B and 10. The print system 100 according to the second embodiment includes, similarly to the first embodiment, a printing device and information processing device which are communicatable with each other.

Specifically, the print system 100 according to the second embodiment has the same configuration as that of the first embodiment except that image editing APP's 411 and 412 are installed in the PC 2. Accordingly, in the following description, portions different from those of the first embodiment will be mainly described, while the similar portions will be simplified or omitted with use of the same reference numbers as used in the first embodiment.

When, for example, the output destination is changed (S6) as shown in FIGS. 9A and 9B, the image editing APP 41 notifies the OS 44 of the change of the output destination (S21), and causes the OS 44 to update the output destination (S22). For example, the image editing APP 411 does not change a default output destination of the image editing APP 411, but changes a default output destination of the OS 44 to the changed output destination which has been changed by the image editing APP 411. In this case, it is assumed that the OS 44 can set the output destination to the print program (including the dedicated print control APP 43) as the default output destination. Steps S6, S21 and S22 are examples of a default changing process and an output destination changing process.

When the print execution instruction is received (S7), the image editing APP 411 requests the OS 44 to transmit the identifier of the default destination (S23). The image editing APP 411 obtains the default output destination from the OS 44 (S24). It is noted that, when the obtained default destination is the dedicated print control APP 43, the image editing APP 411 transmits the startup instruction and the image file to the dedicated print control APP 43 (S9 and S10). Processes thereafter are similar to those described above with reference to the first embodiment and description thereof will be omitted. The process in S24 is an example of an output destination obtaining process.

When the print execution instruction is received (S31), the image editing APP 411 and another image editing APP 412 request the OS 44 to transmit the identifier of the default destination (S32) and obtain the identifier of the default output destination from the OS 44 (S33). In this case, the OS 44 has changed the default output destination to the dedicated print control APP 43 in accordance with the change notification by the image editing APP 411. Therefore, the image editing APP 412 can start the dedicated print control APP 43 without operating the shortcut key (S41). The processes of S41-S46 are similar to the processes in S9-S14 described above and the detailed description thereof will be omitted. The processes of S9 and S41 are examples of a print program startup process.

Next, a case where the PC 2 executes the image editing APP 411 to perform the printing process will be described, referring to FIG. 10. It is note that a detailed description of the processes are the same as those in the first embodiment will be omitted.

When receiving the output destination changing instruction, the CPU 21 changes the default output destination registered with the OS 44 to the changed output destination which has been changed in S104 (S301). For example, the CPU 21 registers the dedicated print control APP 43 with the OS 44 as the default printer. The process in S301 is an example of a default changing process. Further, the processes in S104 and S301 are examples of an output destination changing process.

As described above, by changing the default printer of the OS 44, it becomes possible that the print system 100 reflects the output destination chanted by the image editing APP 411 to the other image editing APP 412. That is, it becomes possible that a process of changing the output destination with the image editing APP 412 can be omitted. Therefore, the image editing APP 411 can simplify a selecting operation to select a printer to which the other image editing APP 412 outputs the print job. Accordingly, the image editing APP 412 may a general purpose image editing APP. Even if such an APP is used, printing with execution of the dedicated print control APP 43 can be performed without requiring a troublesome operation of the user.

It is noted that the configuration of the second embodiment described above is only an example, which is not intended to limit aspects of the present disclosures. Accordingly, configurations of the present disclosures could be modified and/or improved in various ways without departing from the aspects of the disclosures. For example, the printer 1 may not be provided with the operation panel 13. A large-capacity storage device provided to the PC 2 need not be limited to the non-volatile memory 24, but any kind of large-capacity storage device may be provided.

Further, the printer 1 could be a device capable of printing only monochromatic images. In such a case, the PC 2 may be configured not to display selectable options on a color setting regardless of kinds of objects.

Still further, the communication method between the printer 1 and the PC 2 need not be limited to the wireless communication compliant with the Wi-Fi standard. The communication method may be a wired communication method using, for example, a USB cable, or a wireless communication method compliant with the Bluetooth® or other standards. The printer 1 and the PC 2 may have a plurality of communication functions.

The image file subject to be printed may be a label image file to be printed on a label, a PDF file, a compressed file such as a JPEG file, a bitmap file and the like. Further, the image editing APP 41 and the print program corresponding to the format of the image file subject to be printed may be used.

According to the present embodiment, the rasterization is performed by the printer 1 in the second path, but the what is necessary is that the second path is different from the first path, and the rasterization may be performed by the PC 2 in the second path. For example, when the general purpose print control program 45 has a rasterizing function, the rasterization may be performed with use of the rasterizing function of the general purpose print control program 45. Alternatively, even in the first path, the rasterization may be performed by the printer 1. In such case, algorithms of rasterization are different in the first path and the second path. Further, in such a case, the first path is a printing path in which the print control function of the OS 44 is not used, while the second path is a printing path in which the print control function of the OS 44 is used.

The present embodiments are described in assumption that there are two types of printing paths (i.e., the first path and the second path). However, there could be one or more additional paths. Examples of other paths may include a printing path using a dedicated driver or a printing path using CUPS which is a printer driver for Unix, MacOS and Linux®. The dedicated driver or the CUPS are implemented in the OS 44 of the PC 2 (see FIG. 2) and perform rasterizing of the image data.

For example, startup of the print program which is set as the changed output destination may not be done when the print instruction is received. That is, the print program may be started before the print instruction is received. It is noted, however, by starting the print program at the time of receiving the print instruction, a time period required to perform the printing process can be shortened. Further, the number of processes the CPU 21 should perform can be restricted, thereby processing load to the CPU 21 being reduced.

According to the above-described embodiments, every time when the shortcut key is input, the output destination is changed in accordance with the order of the candidates stored in the array. Such a configuration may be modified such that, for example, after storing the list of the printers 1 and the print programs in the RAM 23, they may be displayed on the screen so that one of the candidates (i.e., the printers 1 and the print programs) can be selected with use of the mouse 28 and/or keyboard 25. Alternatively, the user may be required to manually input the output destination to be set. It is noted, however, by configuring the print system 100 such that the output destination is switched, the output destination is set, or a list of candidates is displayed on the screen so that the user can select one of the candidate as the changed output destination, the user can easily set the output destination.

When the image editing APP 41 is configured such that a shortcut key for changing the output destination can be set, all the print programs installed in the PC 2 may be displayed on the output destination changing screen 50, regardless of the manufacturers of the printers 1, and the user is allowed the select any one of the displayed programs.

For example, the shortcut key may not include a shortcut key for the print instruction. For example, the shortcut key may be one totally different from the print instruction shortcut key (e.g., simultaneous operation of "Command" key and "P" key). That is, the shortcut key may be, for example, a simultaneous operation of "F11" and "Alt" keys. It is noted, however, by defining the shortcut key so as to include the print instruction shortcut key (e.g., "Command" and "P" keys), the user can easily remember the shortcut key to select a printer 1.

For example, the processes of S106 and S107 may be omitted. It is noted, however, by including the processes of S106 and S107, it becomes possible to take over the print settings when printing was performed with use of the printer 1 as the printing setting of the print program automatically. Accordingly, troublesome operations of the user to set the print settings when the output destination is set to the print program can be reduced, thereby usability of the print program being improved.

It is noted that the processes described in the embodiments may be performed by a single CPU, a plurality of CPU's, hardware such as an ASIC and/or any combination of the same. Further, the processes described above may be realized by various modes including computer-executable instructions stored in a non-transitory computer-readable recording medium, or a method of controlling the information processing device.

What is claimed is:

1. A non-transitory computer-readable recording medium for an information processing device having a memory and a controller, the recording medium storing computer-executable instructions which cause, when executed, the controller to perform:
 a printer obtaining process of obtaining a list of printers registered with an operating system installed to the information processing device;
 a program obtaining process of obtaining a list of print programs installed in the information processing device;
 a storing process of storing identifiers of the printers listed in the list of printers obtained in the printer obtaining process and identifiers of the print programs listed in the list of the print programs obtained in the program obtaining process in the memory;
 a first detecting process of detecting whether a first user operation is input through an inputting device of the information processing device;
 when the controller detects input of the first user operation in the first detecting process, an output destination changing process of extracting one of the printers and print programs based on the identifiers stored in the memory and set the extracted one of the printers and the print programs to the output destination; and
 when the output destination set in the output destination changing process is one of the print programs installed in the information processing device, starting the print program
 wherein the instructions further cause, when executed, the controller to perform:
 a first receiving process of receiving an execution command of printing through the inputting device; and
 a printing process in which:
  when the execution command is received in the first receiving process and when a currently set output destination is one of the printers registered with the operating system of the information processing device, a print job is output to the printer; and
  when the currently set output destination is a print program, delivers the print job to the print program.

2. The non-transitory computer-readable recording medium according to claim 1,
 wherein, when the controller detects the first user operation, the controller displays a list of the printers and the print programs based on the identifiers stored in the memory on a displaying device of the information processing device.

3. The non-transitory computer-readable recording medium according to claim 1,
 wherein the instructions further cause, when executed, the controller to:
 store execution history of print jobs in the memory; and based on the execution history of print jobs stored in the memory, determine an order of extraction in a descending order of a usage frequency of the printers and the print programs.

4. The non-transitory computer-readable recording medium according to claim 1,
 wherein if a particular printing medium is being selected as a type of a printing medium to be used, ones which cannot perform printing on the particular printing medium are excluded from among the printers and the print programs of which identifiers are stored in the memory.

5. The non-transitory computer-readable recording medium according to claim 1,
 wherein the instructions further cause, when executed, the controller to perform:
 detecting a second user operation is input through the inputting device; and
 receiving the execution command a print instruction when the input of the second user operation is detected,
 wherein the first user operation is an operation of simultaneously performing the second user operation and a third user operation.

6. The non-transitory computer-readable recording medium according to claim 1,
 wherein the instructions further cause, when executed, the controller to perform, when the output destination is changed from the printer to the print program, obtaining default print settings of a change source printer from an operating system of the information processing device, and delivering the obtained print settings to the print program which is set to the output destination.

7. The non-transitory computer-readable recording medium according to claim 1,
 wherein the instructions further cause, when executed, the controller to perform, when the output destination is changed, changing the output destination from a default printer registered with an operating system of the information processing device to the changed output destination.

8. A method of controlling an information processing device having a memory, comprising:
 obtaining a list of printers registered with an operating system installed to the information processing device;
 obtaining a list of print programs installed in the information processing device;
 storing identifiers of the printers listed in the list of printers as obtained and identifiers of the print programs listed in the list of the print programs as obtained in the memory;
 detecting whether a first user operation is input through an inputting device of the information processing device;
 when input of the first user operation is detected, extracting either one of the printers in the list of printers or one of the print programs in the list of print programs stored in the memory and setting the extracted one to the output destination;
 when the output destination is one of the print programs installed in the information processing device, starting the print program;
 receiving an execution command of printing through the inputting device;
 when the execution command is received and when a currently set output destination is one of the printers registered with the operating system of the information processing device, a print job is output to the printer; and when the currently set output destination is a print program, the print job is delivered to the print program.

9. The method of claim 8, further comprising displaying a list of the printers and the print programs based on the identifiers stored in the memory on a displaying device of the information processing device when the first user operation is detected.

10. The method of claim 8, further comprising storing execution history of print jobs in the memory; and
based on the execution history of print jobs stored in the memory, determining an order of extraction in a descending order of a usage frequency of the printers and the print programs.

11. The method of claim 8, wherein if a particular printing medium is being selected as a type of a printing medium to be used, ones which cannot perform printing on the particular printing medium are excluded from among the printers and the print programs of which identifiers are stored in the memory.

12. The method of claim 8, further comprising:
detecting a second user operation is input through the inputting device; and
receiving the execution command when the input of the second user operation is detected,
wherein the first user operation is an operation of simultaneously performing the second user operation and a third user operation.

13. The method of claim 8, further comprising:
obtaining, when the output destination is changed from the printer to the print program, default print settings of a change source printer from an operating system of the information processing device; and
delivering the obtained print settings to the print program which is set to the output destination.

14. The method of claim 8, further comprising changing the output destination from a default printer registered with an operating system of the information processing device to the changed output destination when the output destination is changed.

\* \* \* \* \*

UNITED STATES PATENT AND TRADEMARK OFFICE
CERTIFICATE OF CORRECTION

PATENT NO. : 10,776,054 B2  
APPLICATION NO. : 16/367652  
DATED : September 15, 2020  
INVENTOR(S) : Aiko Mizutani Page 1 of 1

It is certified that error appears in the above-identified patent and that said Letters Patent is hereby corrected as shown below:

In the Claims

Column 16, Claim 5, Line 20 should read:
receiving the execution command

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*